(12) United States Patent
Lund et al.

(10) Patent No.: US 8,081,493 B2
(45) Date of Patent: Dec. 20, 2011

(54) ELECTRONIC POWER CONDITIONER WITH INTEGRATED MAGNETICS

(75) Inventors: Kare Lund, Hvidovre (DK); Lass Solver Pedersen, Ballerup (DK)

(73) Assignee: International Rectifier Corporation, El Segundo, CA (US)

( * ) Notice: Subject to any disclaimer, the term of this patent is extended or adjusted under 35 U.S.C. 154(b) by 317 days.

(21) Appl. No.: 11/675,422

(22) Filed: Feb. 15, 2007

(65) Prior Publication Data
US 2007/0189043 A1 Aug. 16, 2007

Related U.S. Application Data

(60) Provisional application No. 60/773,987, filed on Feb. 16, 2006.

(51) Int. Cl.
*H02M 3/335* (2006.01)
(52) U.S. Cl. ......................................................... 363/17
(58) Field of Classification Search .................... 363/17, 363/65, 71
See application file for complete search history.

(56) References Cited

U.S. PATENT DOCUMENTS

| | | | |
|---|---|---|---|
| 4,533,986 A | 8/1985 | Jones | |
| 5,555,494 A * | 9/1996 | Morris | 363/17 |
| 6,191,964 B1 | 2/2001 | Boylan et al. | |
| 6,400,580 B1 * | 6/2002 | Bowman et al. | 363/17 |
| 6,724,644 B2 | 4/2004 | Loef | |
| 6,853,568 B2 * | 2/2005 | Li et al. | 363/65 |
| 7,218,081 B2 * | 5/2007 | Jang et al. | 323/266 |
| 7,289,341 B2 * | 10/2007 | Hesterman | 363/46 |
| 2005/0285661 A1 | 12/2005 | Wittenbreder, Jr. | |

FOREIGN PATENT DOCUMENTS

EP  1333553  8/2003

* cited by examiner

*Primary Examiner* — Adolf Berhane
*Assistant Examiner* — Yemane Mehari
(74) *Attorney, Agent, or Firm* — Farjami & Farjami LLP

(57) ABSTRACT

A power supply including a main stage converter having a bridge circuit having input switches for receiving input voltage and providing an output, a main transformer and at least one output choke having an integrated magnetic structure coupled to the output of the bridge circuit and at least one rectifier for rectification of voltage received from the bridge circuit and providing a first output voltage.

20 Claims, 8 Drawing Sheets

ELECTRONIC POWER CONDITIONER WITH INTEGRATED MAGNETICS

CROSS-REFERENCE TO RELATED APPLICATION

This application is based on and claims priority to U.S. Provisional Patent Application Ser. No. 60/773,987, filed on Feb. 16, 2006 and entitled NEW ELECTRONIC POWER CONDITIONER WITH TWO CONVERTERS AND INTEGRATED MAGNETICS, the entire contents of which are hereby incorporated by reference herein.

BACKGROUND OF THE INVENTION

The present invention relates to an Electronic Power Conditioner (EPC) for Solid State Power Amplifier (SSPA) and more particularly to a high efficiency main stage converter based on a Full-Bridge input switch with an integrated magnetic structure and Hy-bridge rectification using synchronous rectifiers.

On commercial telecommunication satellites using Phased Array Antennas (PAA), up to 70% of available payload power is handled by a DC/DC converters supplying a Solid State Power Amplifier (SSPA) for each antenna element.

In the recent decades, the satellite communication business segment has experienced vigorous growth. This growth is best exemplified by development in the last decade of satellite fleets. Table 1 illustrates growth of Inmarsat, currently one of the biggest operators of satellites.

TABLE 1

|  | Inmarsat 2 | Inmarsat 3 | Inmarsat 4 |
| --- | --- | --- | --- |
| Satellites in orbit | 4 | 5 | 2 + 1 spare |
| Mass at launch [kg] | 1200 | 2070 | 5950 |
| Launched | 1990-1992 | 1996-1998 | Q1-Q2 2005 |
| PAA elements | 1 | 33 | 150 |
| Mobil Link * EIRP [dBW] | 39 | 48 | 67 |
| Bandwidth [kbps] | 0.6 | Up to 64 | 432 |
| Platform power [W] | 1200 | 2300 | 12000 |
| Payload power [W] | Unknown | 1600 | 9000 |

The growth in the mass of the satellites at launch and the number of satellites in orbit has been driven by an increased need for a transmission signal bandwidth, transmitted signal strength, and transmission coverage on the ground. As indicated in Table 1, the rapid increase in "strength" of the communication payload has been accompanied by an increasing need for power.

For example, for the Inmarsat 4 satellites the Electronic Power Conditioner EPC for SSPA handles 75% of the payload power and 55% of the total power available from the platform. This makes the EPC and the SSPA the single most important payload component for the satellites' power budget. As a natural consequence, efficiency becomes the most important performance parameter for the EPC for SSPA.

The second most important performance parameter is mass. This parameter is driven by penalties charged in the space programs for extra mass. The penalties reflect the cost of lifting and operating the mass in space. The mass penalty for a large Geostationary Earth Orbiting (GEO) communication satellites normally equals 60 $/g. For Inmarsat 4 satellites, which have 150 EPCs for SSPA, this equals a 9000 $/g mass penalty for each of the three delivered satellites.

However, as the overall mass of the 150 EPCs equals approximately 40 kg or less than 1% of the overall mass of the satellite this parameters is not surrounded with the same amount of concern as the efficiency. Thus, the two key parameters for an EPC for SSPA are efficiency followed by mass.

SUMMARY OF THE INVENTION

It is an object of the present invention to provide an optimum topology for a main stage converter for an EPC for SSPA, selected with respect to efficiency and mass.

It is another object of the present invention to include considerations for EMC performance, component availability, physical realization, and qualified processes in the provided optimum EPCs for SSPA topology.

A power supply is provided. The power supply includes a main stage converter having a bridge circuit having input switches for receiving input voltage and providing an output, a main transformer and at least one output choke having an integrated magnetic structure coupled to the output of the bridge circuit and at least one rectifier for rectification of voltage received from the bridge circuit and providing a first output voltage.

Other features and advantages of the present invention will become apparent from the following description of the invention that refers to the accompanying drawings.

DETAILED DESCRIPTION OF EMBODIMENTS OF THE INVENTION

The preferred embodiment of the present invention provides an ultra high efficiency main stage converter, which is based on a Full-Bridge input switch with an integrated magnetic structure and Hy-bridge rectification using synchronous rectifiers. This topology offers almost ideal cancellation of the input and output ripples when a tightly regulated bus is used. A non-isolated embodiment of the present invention is also provided.

Figure 1:
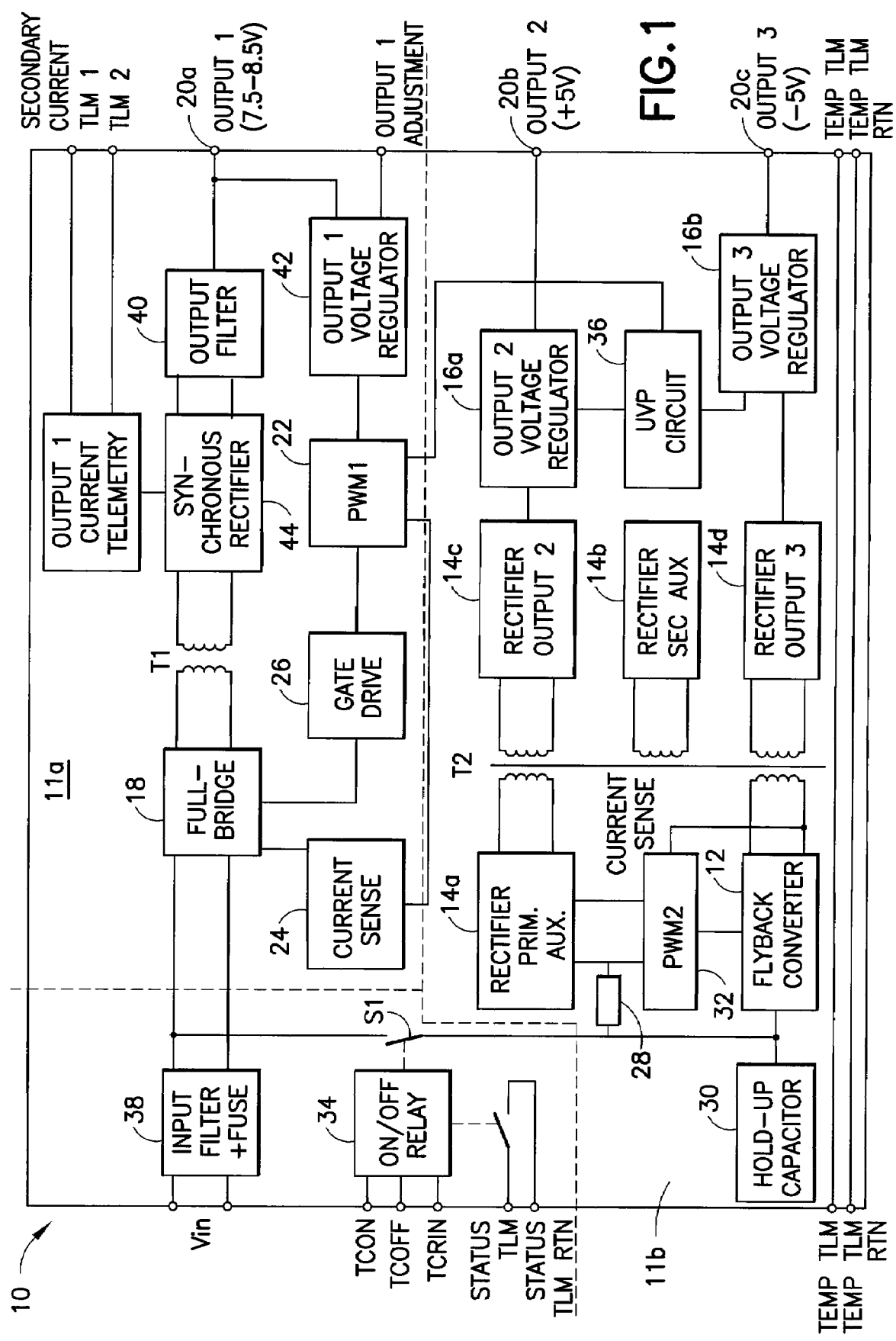
FIG. 1 is a block level diagram of an EPC of the present invention.

FIG. 1 illustrates an EPC 10 of an embodiment of the present invention including two converters. The embodiment of EPC 10 shown is a 60 W EPC having efficiency of more than 93% when galvanic isolated and 94% when galvanic DOD-isolated and includes two auxiliary outputs. A high efficient main or first converter stage 11a provides a first output 20a and a second simple, small converter stage 11b provides second and third auxiliary outputs 20b and 20c.

The first converter stage 11a utilizes a Full-Bridge circuit 18 driving a Hy-bridge topology. The Full-Bridge 18 drives a transformer T1, whose secondary feeds synchronous rectifier 44 and filter 40. To maintain high efficiency and at the same time to cross the galvanic isolation barrier, a gate driver 26 is used to control the bridge MOSFETs, instead of an active part, e.g., IR2110 manufactured by International Rectifier Corporation. The gate driver 26 receives a signal from a Pulse Width Modulation (PWM) driver 22 that delivers peak current mode control with direct voltage sense. The PWM driver 22 receives signals from a current sense circuit 24 and an output voltage regulation circuit 42. The circuit 42 evaluates the first output signal 20a and a signal indicating adjustment to the value of the first output signal 20a.

The second converter stage 11b utilizes a Fly-back converter 12 for providing an internal auxiliary power supply and feeding linear voltage regulators 16a and 16b a transformer T2 placed on the secondary side and provides a +5V second output 20b and a −5V second output 20c. The linear voltage regulator 16a receives input from a second rectifier output circuit 14c and the linear voltage regulator 16b receives input from a second rectifier output circuit 14d. Linear voltage regulators for second and third outputs 20b and 20c ensure well regulated (±/−2% EOL) low noise output voltages and individual current limitation.

For an initial start-up, a simple dropdown resistor 28 supplies voltage from the bus to PWM drive 32. A hold-up capacitor 30 is coupled to the bus via switch S1. For high efficiency, the Fly-back converter 12 is powered and regulated by use of a primary AUX bootstrap winding 14a. A secondary AUX winding 14b is also provided in the second converter stage 11b.

A current mode control scheme may be selected for the fly-back converter 12. The current mode control is selected for simple tuning of the control loops, to eliminate line regulation issues and in combination with the integrated magnetic structure to eliminate saturation of the transformer, even during an abnormal operation.

Timing between outputs is always an issue of great concern for EPCs. The SSPA Gallium Arsenide Field Effect Transistor (GaAsFET) needs a negative voltage to pinch off the channel before the positive main output is applied. Failure to do so results in destruction of the GaAsFETs and loss of the SSPA function. With full control and fault separation of all voltages, it is possible to make a well controlled timing between all outputs. The hold-up circuit 30 provides energy for the negative, third output during a power down.

The EPC 10 receives voltage input $V_{IN}$ to a an input filter and fuse circuit 38 and provides the first output 20a through an output filter circuit 40. The ON-OFF control scheme is achieved through the use of a latching relay 34 driving switch S1 to interface with a standard high level pulse command making it easy adaptable to most platform specifications. Additionally, the EPC 10 utilizes an input Under Voltage Protection (UVP) circuit 36 placed on the secondary converter 11b side and connected to linear voltage regulators 16a and 16b. This is done in order for the UVP circuit 36 to be an integral and combined part of the timing circuit ensuring a well defined performance during start-up and shut down.

Table 2 provides an example of key parameters, of the 60 W EPC of FIG. 1.

TABLE 2

| Input bus voltage $V_{IN}$ | | 50 V ± 1% | Astrium Eurostar 3000 platform |
|---|---|---|---|
| Output 1, | voltage | 7.5 V-9 V (±2%) | Output is user adjustable |
| | Current | 6.7 A, 7.5 A | Max Load Current limit min. |

TABLE 2-continued

| | Power | 60.3 W | Max. |
|---|---|---|---|
| | Output Ripple | <5 mVrms | Frequency domain including CS |
| Output 2, | voltage | 5 V (±2%) | |
| | Current | 0.27 A | Max |
| | Power | 1.35 W | Max |
| | Output Ripple | <2 mVrms | Frequency domain including CS |
| Output 3, | voltage | −5 V (±2%) | |
| | Current | 0.25 A | Max |
| | Power | 1.25 W | Max |
| | Output ripple | <1 mVrms | Frequency domain including CS |
| Protection | | | Over current protection on all output. Under voltage shutdown on input. |
| TC | | Pulse command | Latching relay |
| Timing between outputs | | YES | −5 V to arrive 2 msec. before positive outputs at turn ON, vice versa at Turn OFF |

Selection of the Main Converter Topology

Because 96% of the EPC power is handled by the main converter stage 11a, the efficiency and mass of the EPC 10 is mainly determined by this stage. The rationale for selecting the above described topology for this converter is described below. Efficiency and mass are estimated for three main parts of the converter stage, a primary power bridge, a transformer and chokes, and a rectifier stage. A solution selected for each part and a most promising alternative are analyzed, all efficiency calculations were performed at: $V_{IN}$=50V; first output 8.5V, 6.7 A; second output 5V, 200 mA (nominal load), and third output −5V, 190 mA (nominal load).

During the last decade, design tools for most commonly used power topologies have been developed and refined. These tools are able to predict with great precision the efficiency and mass of a power stage. In the present specification, such a tool was used to calculate efficiencies for a preferred and the alternative solutions.

For the main bridge a clamped Full-Bridge with Zero Voltage Switching (ZVS) was selected from between a Full- and Half-Bridges. The clamped bridge is controlled in a manner where a primary winding is shorted in the off-periods when no voltage is applied to the winding. This preserves the energy stored in the leakage inductance for the transformer for charging the capacitance of the mosfets prior to turn-on ZVS. In the selected bridge the voltage stress does not exceed the supply and the relatively low input voltage makes it possible to use 100V MOSFETs and still keep a 50% derating for $V_{DS}$.

The Full-Bridge was selected after a comparison was made of results of use of the Full-Bridge with results of use of the Half-Bridge. Because the Half-Bridge is not clamped, its use results in voltage spikes and, in low load situations, is associated with numerous problems that are due to the Half-Bridge's limited ability to lead the current back to the bus. These disadvantages mean that designers will often have to change the sync. rectifiers 44 to 100V types. Also, a snubber will have to be used to control the spikes. Therefore, the choice between the full and Half-Bridges is a choice between higher efficiency and higher mass (if any).

Further, a die size 3IRHF57130, from International Rectifier Corporation, is used for the EMC 10, This size is a good trade-off between conductive losses and switch losses for the actual power level. In the Half-Bridge, higher currents would call for a larger die size. No other component provides a better result.

Efficiency results only for the main stage 11a of the EMC 10, using the above described design features are illustrated in Table 3. The same component types are used for both Full- and Half-Bridge structures. The best EMC 10 efficiency is found to be at 110 kHz. At lower frequencies the efficiency benefits are found to be negligible and the mass of the magnetic parts is forced to grow to unacceptable levels.

The slightly lower losses of the Half-Bridge magnetic structure are due to zero transformer current in the OFF period. The mass penalty for using a Full-Bridge as compared to a Half-Bridge is 5 g. Because efficiency is a key parameter for the EPC, the Full-Bridge clearly provides superior performance.

Additionally, the Full-Bridge produces clean and almost spike free voltage and current waveforms. For regulated busses and constant output voltage it can get close to 100% duty cycle and thereby, constant current draw leading to a need for a very limited input filter.

TABLE 3

|  | Full-Bridge | | Half-Bridge | |
| --- | --- | --- | --- | --- |
| Magnetic | 0.758 W | 1.27% | 0.699 W | 1.16% |
| Bridge | 0.714 W | 1.20% | 1.116 W | 1.86% |
| Rectifiers | 1.042 W | 1.75% | 1.044 W | 1.74% |
| Ploss tot. | 2.62 W | 4.4% | 3.163 W | 5.26% |
| Total η |  | 95.6% |  | 94.74% |

Choice of Magnetic Layout

Figure 2:
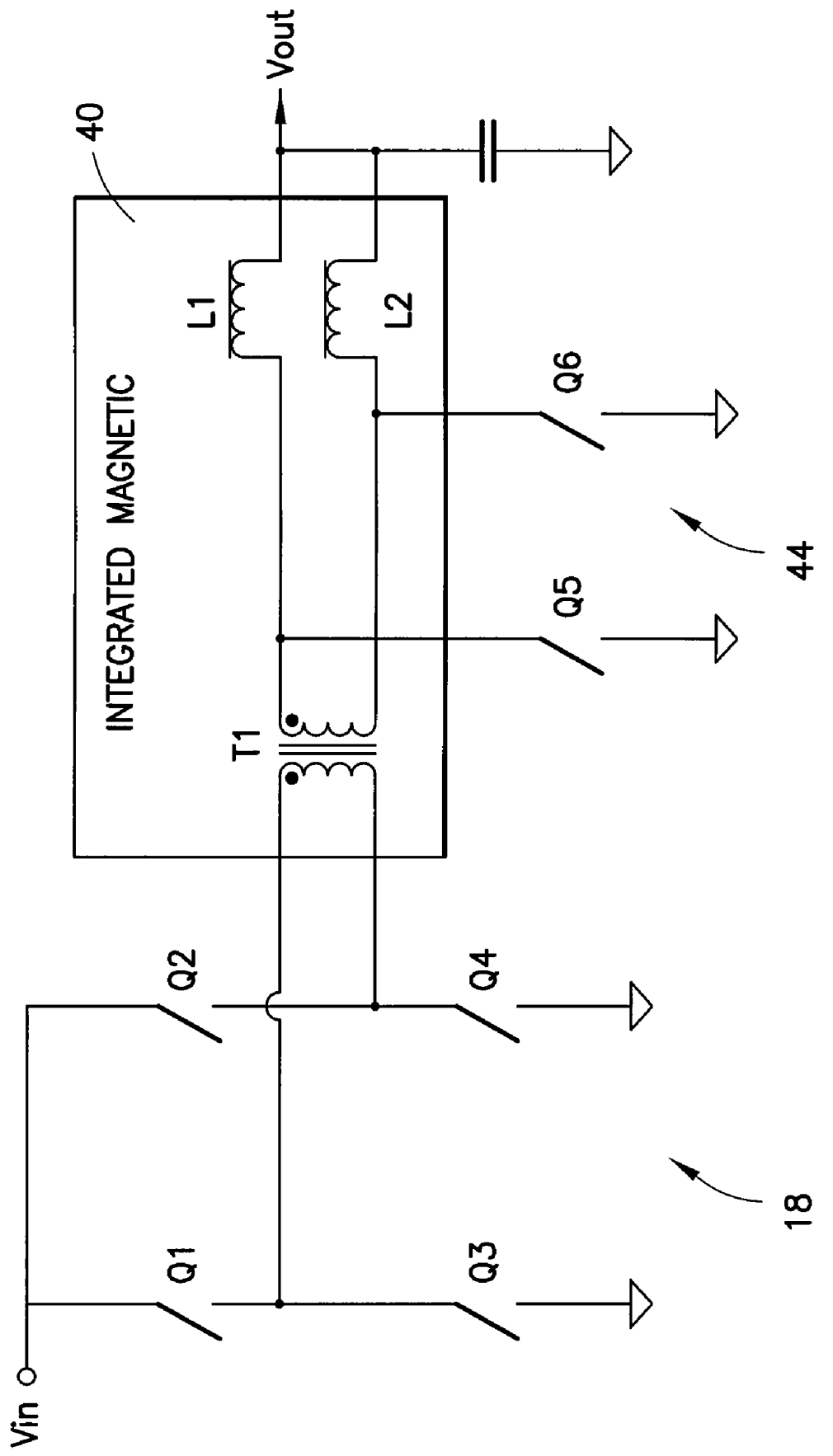
FIG. 2 is an electrical diagram of an integrated magnetic structure of the main stage of the EPC of the present invention.

The main transformer T1 and the output chokes of the first converter 11a are based upon an integrated magnetic structure in order to optimize efficiency, mass and volume of the EPC. This means, as illustrated in FIG. 2, that a transformer T1 and inductors L1 and L2 use the same magnetic core and are realized as one integrated magnetic component. Switches Q1 and Q2 provide input voltage $V_{IN}$ to a primary coil of the transformer T1. Also, a switch Q3 is in series connected to the switch Q1 and a switch Q4 is in series connected to the switch Q2 to provide input voltage $V_{IN}$ to the inductors L1 and L2 respectively. Further, switches Q5 and Q6 are respectively connected between the inductors L1 and L2 and the ground.

Combining the transformer and the output chokes on the same core presents several advantages. These advantages include optimum utilization of a ferrite core; free magnetizing current in the transformer, no saturation of the transformer during turn-On and turn-Off, low stray magnetic field, and lower losses for same mass. Therefore, an integrated magnetic (IM) structure provides an electrical improvement and also maximizes the utilization of the magnetic material.

For mass comparison a calculation setup for a traditional Hy-bridge converter built with discrete components and the same surrounding components has been made. EFD cores are found to be the best alternative and have been scaled to give the converter the same efficiency as for a baseline of the IM structure. The efficiency results supporting the above discussion are shown in Table 4.

TABLE 4

|  | IM | | Discrete magnetic | |
| --- | --- | --- | --- | --- |
| Magnetic | 0.758 W | 1.27% | 0.822 W | 1.38% |
| Bridge | 0.714 W | 1.20% | 0.714 W | 1.20% |
| Rectifiers | 1.042 W | 1.75% | 1.042 W | 1.75% |
| Ploss tot. | 2.62 W | 4.4% | 2.683 W | 4.5% |
| Total η |  | 95.6% |  | 95.5% |

The mass of the IM structure is 37.5 g and the discrete magnetic mass is found to be approximately 57.8 g. While the IM structure solution is more complicated to manufacture and test, it is proven to be superior with a mass benefit of more than 20 g and no efficiency drawbacks.

Choice of Main Output Rectifier

The choice of using the Hy-bridge is due to its efficiency of performance and the fact that the IM structure can be utilized with the Hy-bridge topology to include the associated advantages.

A Hy-bridge rectifier operates optimally with a clamped input bridge, therefore combining all the beneficial parameters from other topologies. During the OFF period the rectifiers 44 "share" the output current, the currents will differ with the current in the leakage inductance of the transformer. With synchronous rectifiers 44 the Hy-bridge also has the ability to transfer current back to the line.

The output rectification may be made with either synchronous rectifiers 44 or diodes. Efficiency and mass calculations have been made and results shown in Table 4 for both methods. Switch timing is of outmost importance for an efficient converter when a MOSFET is being selected as synchronous rectifier. This means that the best efficiency is not found with the part with lowest $R_{DS}ON$ but with the part that in combination with a good $R_{DS}ON$ is "light" to drive.

The best combination for the 60 W EPC of FIG. 1, is found using a size 4 die IRF7YSZ44VCM. An amobead (magnetic snubber) is used to prevent the switch transition to strike a resonance between the stray inductance and the mosfet's output capacitance. By preventing the resonance, snubbers other than the amobead on the secondary side are not necessary. It cost approximately 100 mW, close to 0.2% efficiency, to insert the amobead.

As shown in table 5, if diodes are used, the best choice is 1N6815 a 40 V 25 A in a ThinKey-2 package.

TABLE 5

|  | MOSFET | | Diode (1N6815) | |
| --- | --- | --- | --- | --- |
| Magnetic | 0.758 W | 1.27% | 0.77 W | 1.26% |
| Bridge | 0.714 W | 1.20% | 0.715 W | 1.17% |
| Rectifiers | 1.042 W | 1.75% | 2.808 W | 4.58% |
| Ploss tot. | 2.62 W | 4.4% | 4.293 W | 7.0% |
| Total η |  | 95.6% |  | 93.0% |

Because the efficiency is the key parameter for the EPC, synchronous rectification is selected even though it increases the mass of the EPC by an estimated to 9 g.

The Hy-bridge provide a double frequency. For regulated busses and constant output voltage the Hy-bridge can get close to 100% duty cycle and thereby the output current will get close to cancellation and become a DC current, requiring a very limited output filter. The size/mass of the output filter is often set by other parameters like load step and loop performance immunity to various load impedances.

Synergy of the Main Stage

The choice to combine the clamped Full-Bridge with the synchronous rectified Hy-bridge on the integrated magnetic structure is not a combination of three randomly made independent choices. The clamped bridge shorts a primary winding thereby preserving the energy for ZVS. But, the same energy/current on a secondary winding will keep most of the output current in the rectifier that is about to be turned off. This means that there is still a "positive" current in the amobead/rectifier for output currents that are smaller than when an unclamped bridge had been used and the rectifiers had shared the output current equally. As a result, in the clamped bridge configuration, the amobead lowers the maximum output current down to 3%. For the non clamped bridge configuration, the current in the amobead goes negative when the converter goes into a light-mode (the current continues negative) at 30% of the maximum output current.

The integrated magnetic structure 50 of FIG. 2 can contain a transformer T1 winding and both output inductors L1 and L2 at the same time. Each of the two output inductors being mounted on a leg of an E-core. If phased correctly, he two output inductors L1 and L2 will share the same DC flux and force the AC flux to flow in the third leg. This AC flux will be equal to the AC flux in the transformer T1. Hence, the transformer T1 can have a free ride on the third (middle) leg of the E-core.

Figure 3A:
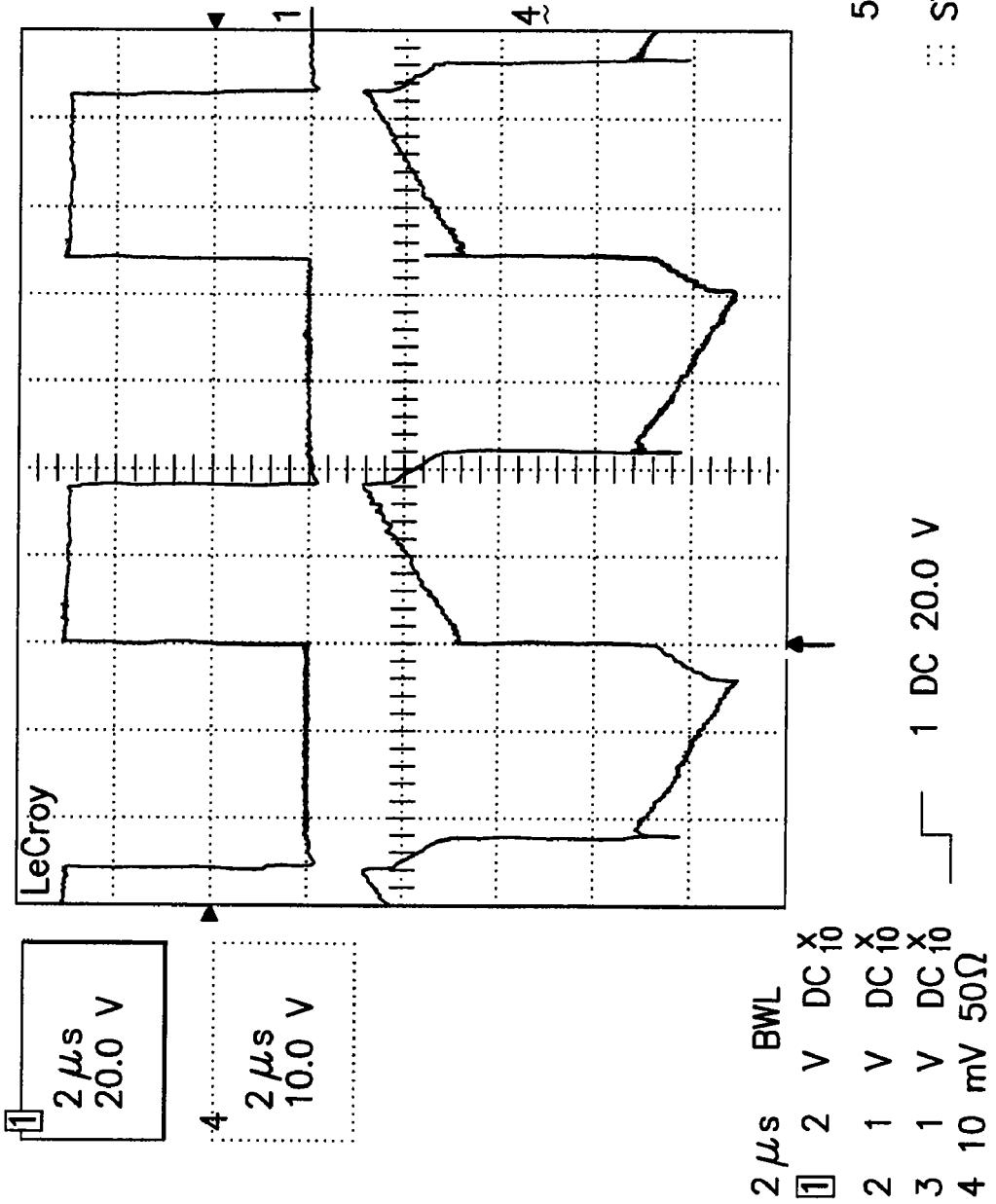
FIG. 3a is a graph of the voltage on the bridge and the current in the primary winding of the transformer.

FIG. 3a illustrates a graph of the voltage on one branch of the main bridge and the current into the primary transformer winding. The voltage and current waveforms are without spikes and display a minimal component stress.

Figure 3B:
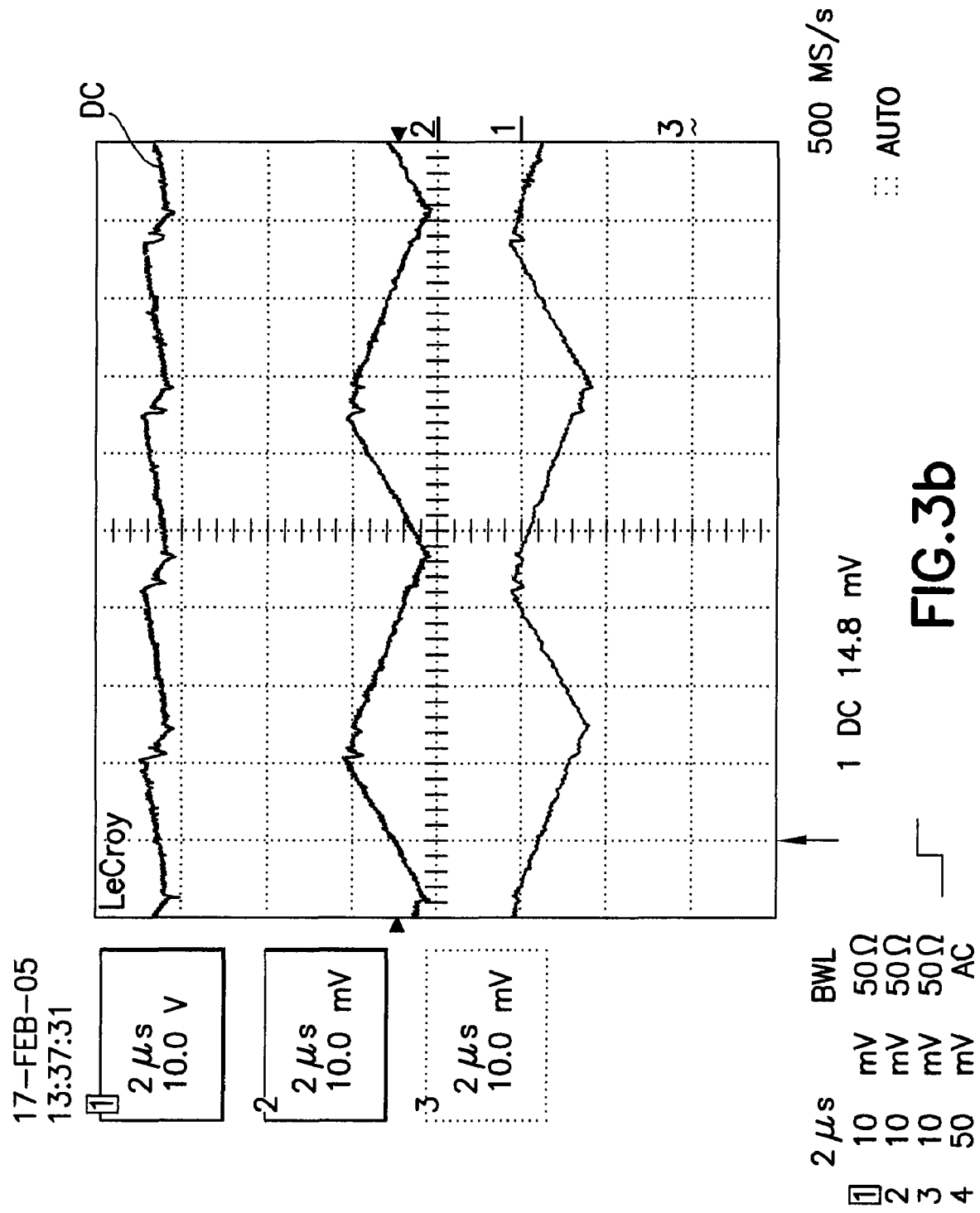
FIG. 3b is a graph of the inductor currents.
Figure 3C:
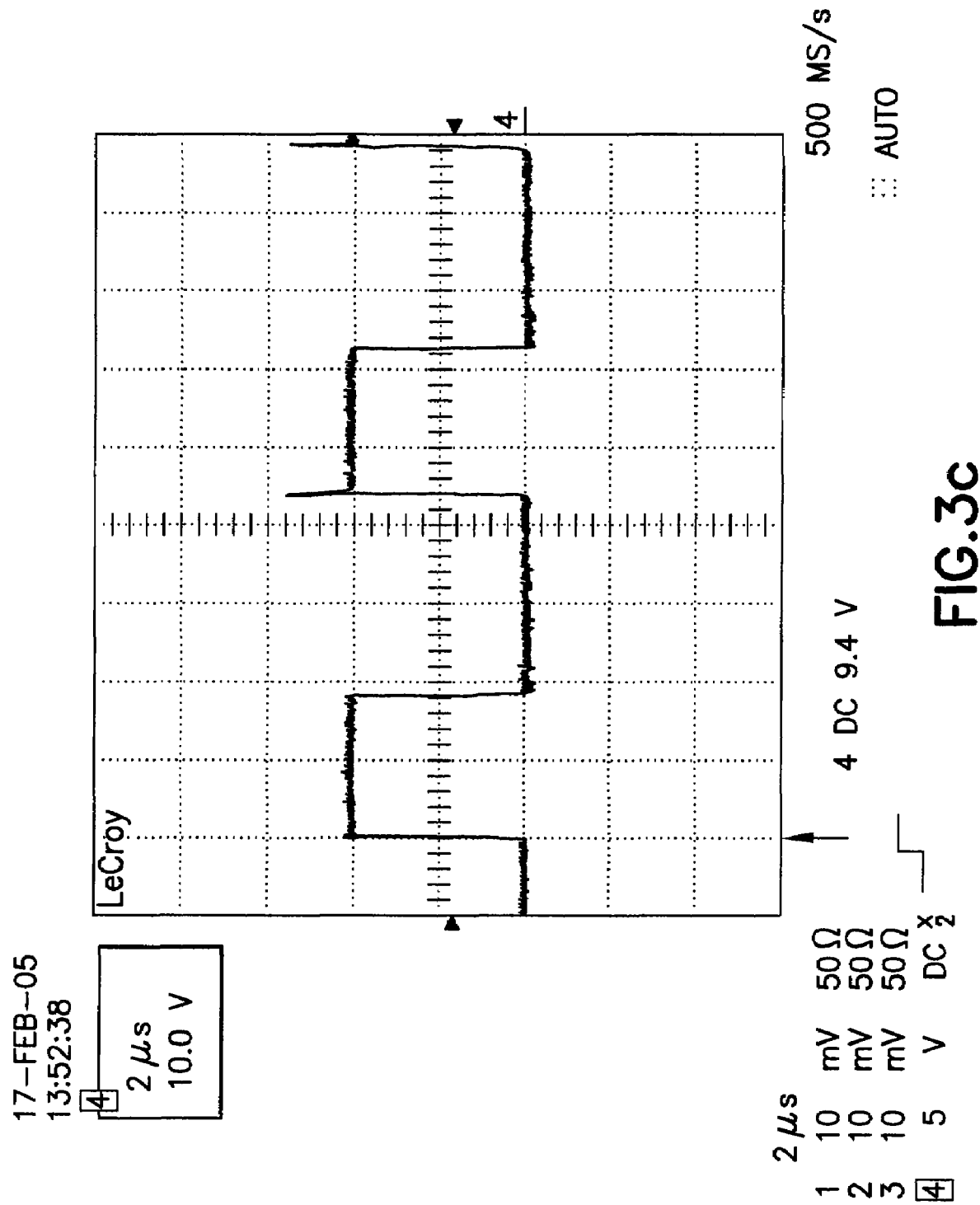
FIG. 3c is a graph of drain voltage of one of the rectifiers.

Further, as illustrated in FIG. 3b, when the input duty cycle gets close to 50%, the output current ripple of the two output inductors L1 and L2 will almost cancel each another out. FIG. 3b shows the currents of each output inductor. Output voltage $V_{OUT}$ of 8.5V equals approximately a duty factor of 0.42. The AC corposants 1 and 2 are almost the reverse of each other and add up to become close to a pure DC current shown at the top of the graph. FIG. 3c illustrates that the drain voltage of the synchronous rectifier 44 (FIG. 1) includes only a limited high frequency spike.

Figure 3D:
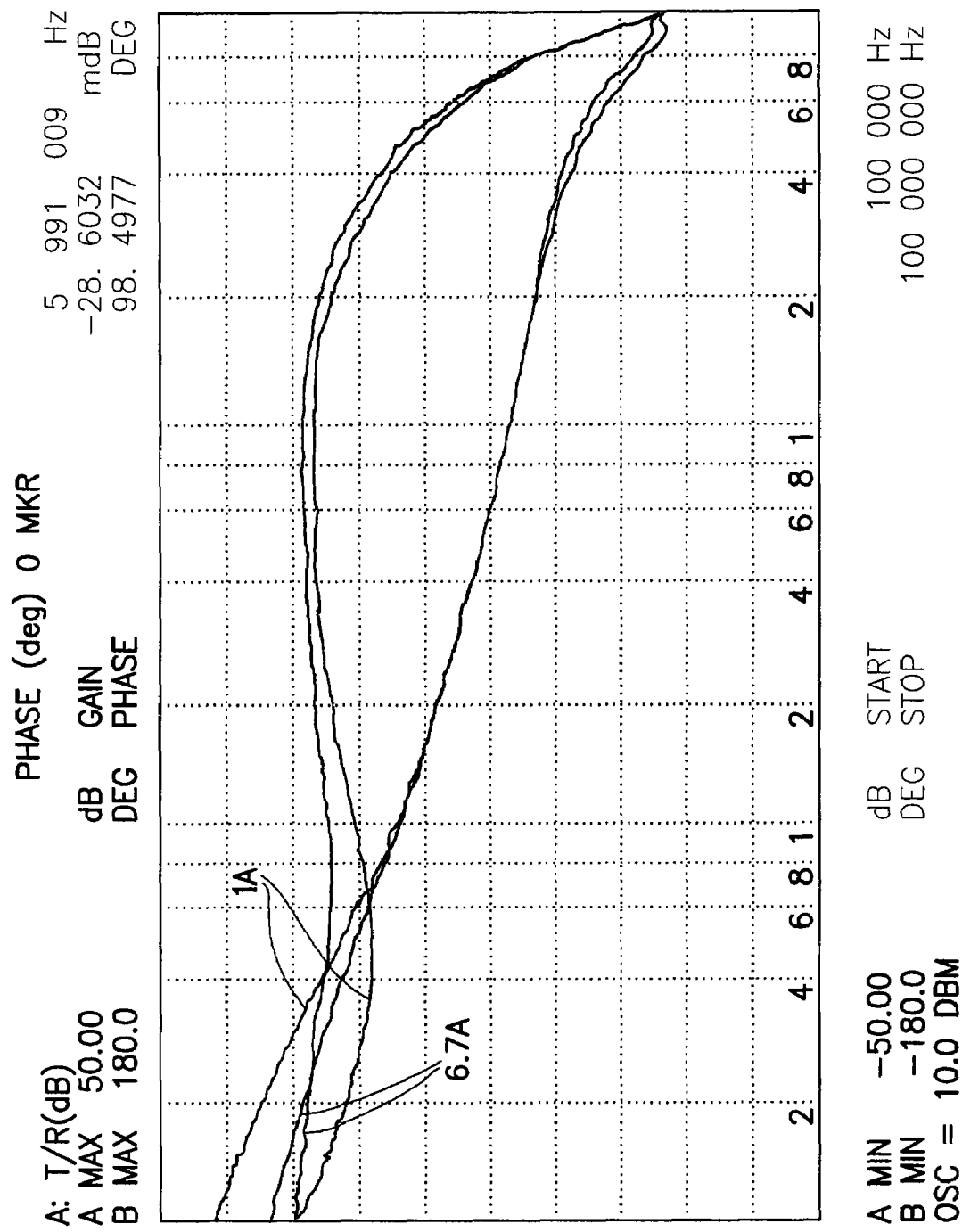
FIG. 3d is a graph of performance of a synchronous rectifier loop feeding current back to the bus.

The ability to feed current back to the bus when synchronous rectifiers are used, provides an additional advantage that the converter does not enter into light mode as a diode rectified converter would do when turned on, the current will not go to zero but continue negative. Therefore, the loop is not influenced and does not become highly load dependent as normal converters do when entering light mode. FIG. 3d illustrates the loop performance for a full load current of 6.7 A and current of 1 A. GM=>19 db and PM=>95°. The loop performance at 1 A, which is deep into normal light mode, is almost the same as that for maximum load.

Figure 3E:
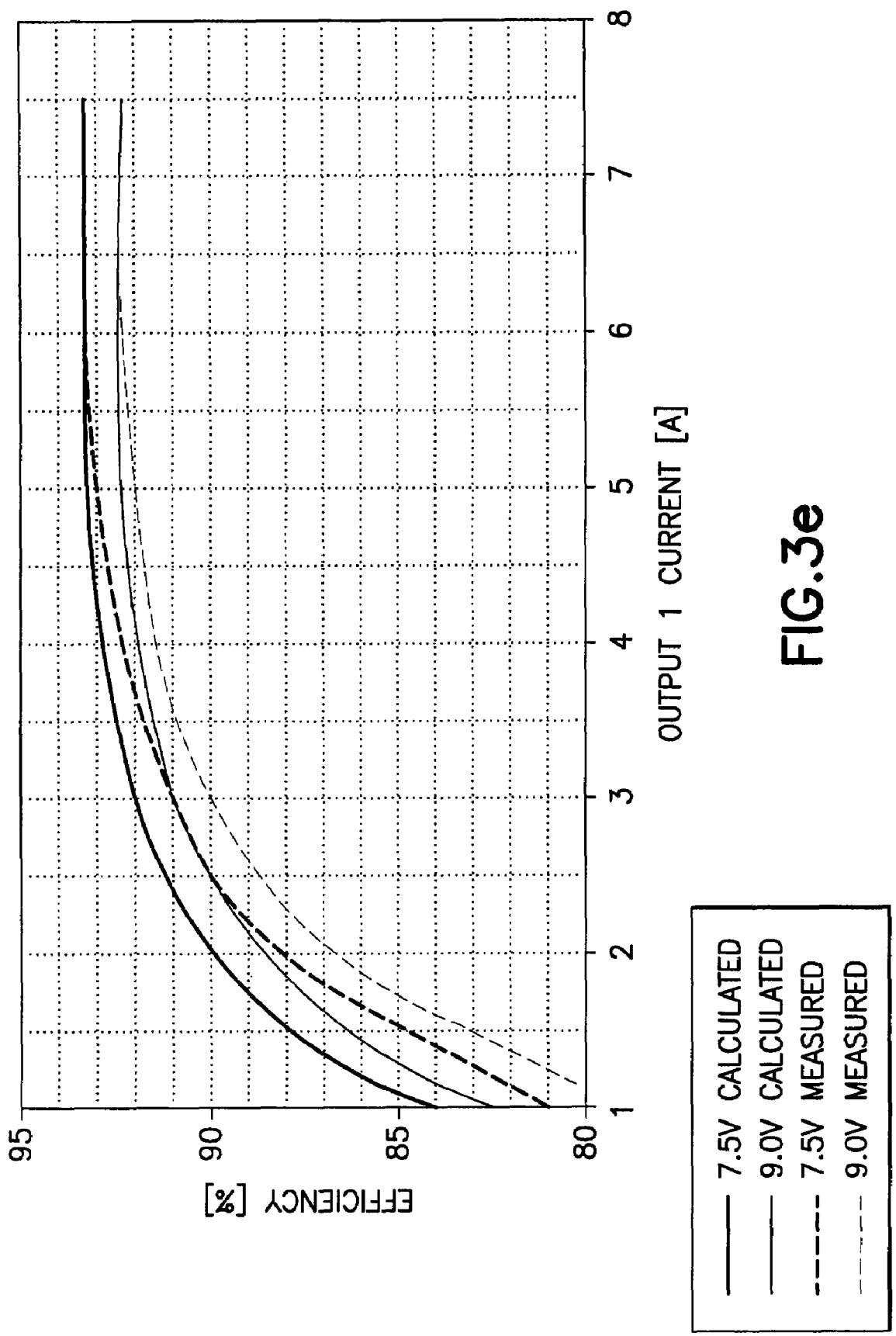
FIG. 3e is a graph of efficiency of the Full-Bridge EPC measured and calculated for 7.5V and 9V voltages at 25° C.

The measured efficiency is close to the predicted performance at full load. When the output current is decreased the performance is lower than predicted due to the stray inductance. Sufficient energy is not stored for ZVS for lower currents. Moreover, the timing is trimmed for maximum performance at minimum load. The calculation tool presumes ZVS and perfect timing. FIG. 3e shows efficiency of the Full-Bridge EPC measured and calculated for 7.5V and 9V voltages at 25° C.

With the rapid growth in the need for satellite communication bandwidth and hence power, the customers are demanding better and better efficiencies in future programs. Improving the 93% efficiency is not an easy task that requires new and innovative solutions. One possible path to making these improvements is described below. This path requires a close interaction between the satellite platform developers and the EPC design groups in development of future design solutions.

Almost all satellite platforms demand galvanic isolation. Galvanic isolation poses many difficult issues. For example, the current sense needs to cross the isolation barrier and a current transformer is required instead of a simple sense resistor.

Figure 4:
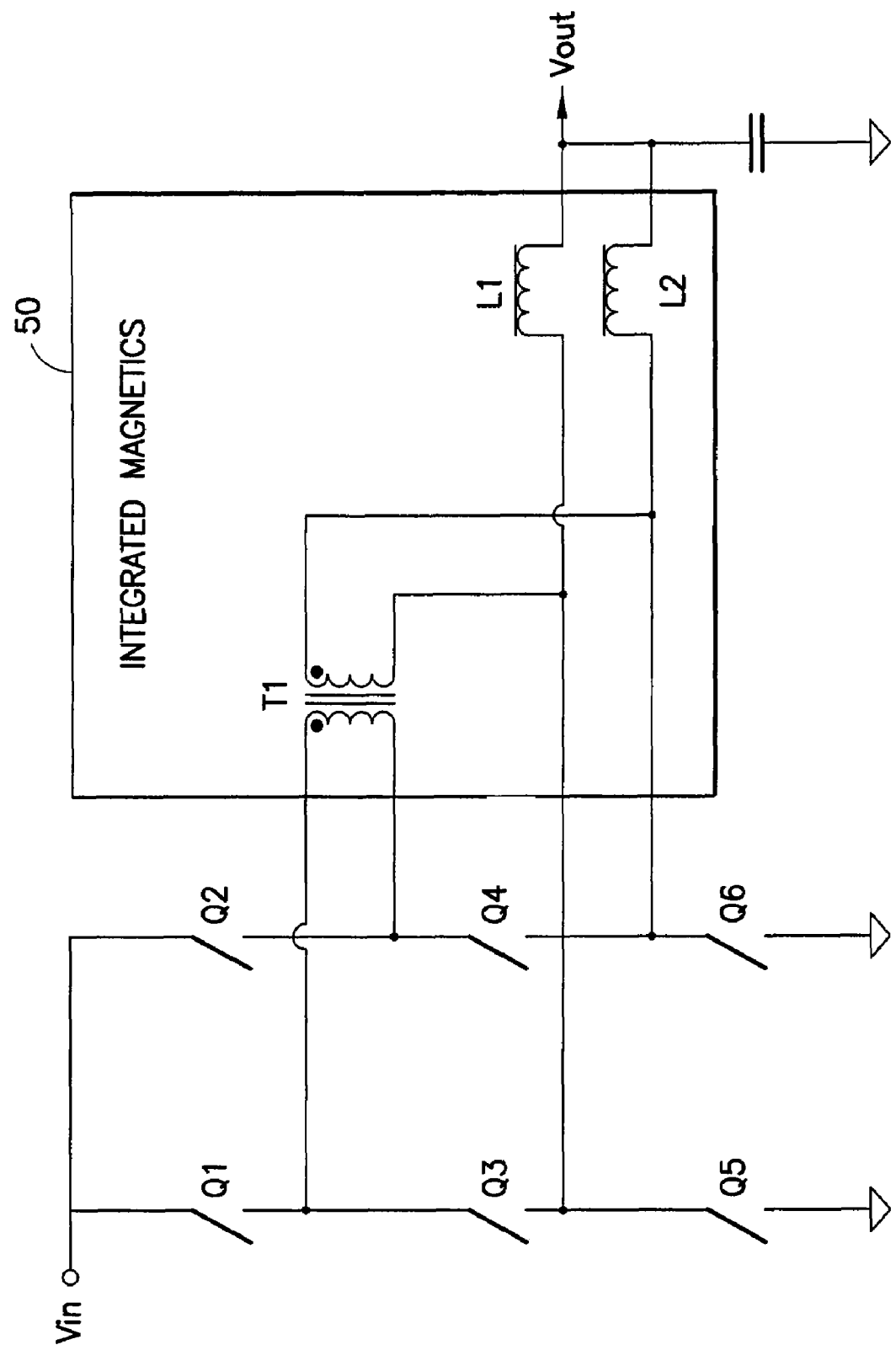
FIG. 4 is an electrical diagram of a non-isolated integrated magnetic structure of the main stage of the EPC of the present invention.

The topology of the present invention, using a Full-Bridge converter with a Hy-bridge rectifier, may be realized, as illustrated in FIG. 4, as a non-isolated circuit using an auto transformer solution. However, such circuit is still based on an integrated magnetic structure. Calculations of efficiency for a galvanic isolated solution versus non-galvanic isolated solution shows in Table 6.

TABLE 6

|  | Isolated | | Non-Isolated | |
| --- | --- | --- | --- | --- |
| Magnetic | 0.758 W | 1.27% | 0.488 W | 0.83% |
| Bridge | 0.714 W | 1.20% | 0.679 W | 1.15% |
| Rectifiers | 1.042 W | 1.75% | 0.680 W | 1.15% |
| Ploss tot. | 2.62 W | 4.4% | 1.949 W | 3.3% |
| Total η | | 95.6% | | 96.7% |

Therefore, the overall efficiency of the EPC can be improved from 93% to 94%. This improvement represents a 15% lowering of power loss, which is a substantial improvement. In addition to the efficiency improvements, the converter is made simpler, lighter, smaller and cheaper. The development time is decreased and the EMC performance is improved.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A power supply comprising:
a main stage converter having a bridge circuit having input switches for receiving input voltage and providing an output;
a main transformer and a plurality of output chokes having an integrated magnetic structure coupled to the output of the bridge circuit; and
at least one rectifier for rectification of voltage received from the bridge circuit and providing a first output voltage;
wherein the main transformer and at least two of the plurality of output chokes use a same magnetic core and are realized as one integrated magnetic component.

2. The power supply of claim 1, further comprising:
a second stage converter having a converter circuit primary and secondary rectifier bootstrap windings, and at least one second rectifier output circuit for providing at least one second output voltage.

3. The power supply of claim 1, further comprising a tightly regulated bus for cancellation of the input and output ripples.

4. The power supply of claim 1, wherein the main transformer has a primary winding receiving the output of the bridge circuit to the at least one rectifier and to at least one of said integrated output chokes.

5. The power supply of claim 1, wherein said bridge circuit and the at least one rectifier are coupled in a non-isolated configuration and an output of the bridge circuit is coupled to a primary winding of the main transformer and the at least one rectifier is coupled to at least one of said output chokes, a secondary winding of the main transformer being coupled to at least one of said output chokes.

6. The power supply of claim 1, wherein the at least one rectifier comprises at least one synchronous rectifier.

7. The power supply of claim 1, where there are two output chokes each connected in series with the main transformer secondary winding.

8. The power supply of claim 1, wherein the at least one rectifier provides Hy-Bridge rectification.

9. The power supply of claim 1, wherein the transformer and at least one of the output chokes are mounted on a respective leg of the same magnetic core.

10. The power supply of claim 1, wherein some of the at least two output chokes are phased to share the same DC flux and to force AC flux to flow in the winding of the transformer.

11. A power supply comprising:
a main stage converter having a bridge circuit having input switches for receiving input voltage and providing an output;
a transformer and at least one output choke having an integrated magnetic structure coupled to the output of the bridge circuit;
at least one rectifier for rectification of voltage received from the bridge circuit and providing a first output voltage;
a second stage converter having a converter circuit, primary and secondary rectifier bootstrap windings, and at least one second rectifier output circuit for providing at least one second output voltage.

12. The power supply of claim 11, wherein the bridge circuit is a Full-Bridge converter and the converter circuit is a Fly-back converter.

13. The power supply of claim 11, wherein the main stage converter further comprises:
an output voltage regulation circuit for evaluating the first output voltage and providing an adjustment to the first output voltage; a current sense circuit coupled to the bridge circuit for evaluating the input voltage;
a first Pulse Width Modulation (PWM) circuit for receiving the adjustment to the first output voltage and the evaluation of the input voltage; and
a gate drive circuit for controlling the bridge to maintain high efficiency and to cross the galvanic isolation barrier, the gate drive circuit being coupled between the bridge and the first PWM circuit, wherein the gate transformer receives a signal from the first PWM driver that delivers peak current mode control with direct voltage sense.

14. The power supply of claim 13, wherein the second stage converter further comprises second and third output voltage regulators;
a dropdown resistor for a second PWM circuit; and
a hold-up capacitor;
the second PWM circuit regulating the converter circuit.

15. The power supply of claim 14, wherein the second and third output voltage regulators provide regulated low noise output voltages and current limitation of +5V and −5V respectively.

16. The power supply of claim 15, wherein the negative voltage of the third output may be used to pinch off a channel of a Gallium Arsenide Field Effect Transistor (GaAsFET) before the first output is applied.

17. The power supply of claim 16, wherein the circuit provides energy for the third output during a power down.

18. The power supply of claim 17, further comprising:
an input filter and fuse circuit for receiving and providing the input voltage to the bridge circuit;
an output filter circuit for receiving and outputting the output voltage from the synchronous rectifier;
a latching relay for an ON-OFF control scheme for providing the input voltage to the bridge circuit; and
an Under Voltage Protection (UVP) circuit in the second stage converter coupled to second and third output voltage regulators and a first PWM driver circuit.

19. A power supply comprising:
a converter stage having a bridge circuit having input switches for receiving input voltage and providing an output;
a transformer and an output choke having an integrated magnetic structure coupled to the output of the bridge circuit; and
at least one rectifier for rectification of voltage received from the bridge circuit and providing a first output voltage;
wherein the transformer and the output choke use a same magnetic core that has at least first and second legs, a winding of the transformer mounted on the first leg and the output choke mounted on the second leg.

20. The power supply of claim 19, wherein the output choke and another output choke are phased to share a same DC flux and force an AC flux to flow in the first leg, the AC flux being equal to an AC flux in the transformer.

* * * * *